United States Patent [19]

Koshimo

[11] Patent Number: 5,149,303
[45] Date of Patent: Sep. 22, 1992

[54] CLUTCH DAMPER DISC ASSEMBLY

[75] Inventor: Masahiko Koshimo, Neyagawa, Japan

[73] Assignee: Kabushiki Kaisha Daikin Seisakusho, Osaka, Japan

[21] Appl. No.: 465,191

[22] PCT Filed: May 25, 1989

[86] PCT No.: PCT/JP89/00523

§ 371 Date: Feb. 21, 1990

§ 102(e) Date: Feb. 21, 1990

[87] PCT Pub. No.: WO89/12768

PCT Pub. Date: Dec. 28, 1989

[30] Foreign Application Priority Data

Jun. 24, 1988 [JP] Japan .................. 63-156205

[51] Int. Cl.$^5$ ........................ F16D 3/12; F16D 3/14
[52] U.S. Cl. ........................ 464/68; 192/106.2
[58] Field of Search ................ 464/68, 64, 66; 192/106.2

[56] References Cited

U.S. PATENT DOCUMENTS

| | | | |
|---|---|---|---|
| 4,360,352 | 11/1982 | Lamarche | 464/68 X |
| 4,557,702 | 12/1985 | Takeuchi | 464/68 |
| 4,560,054 | 12/1985 | Kayanoki et al. | 464/68 |
| 4,562,912 | 1/1986 | Kabayama | 464/68 |
| 4,573,945 | 3/1986 | Kajitani et al. | 464/68 |
| 4,591,348 | 5/1986 | Takeuchi et al. | 192/106.2 |
| 4,655,337 | 4/1987 | Carmillet et al. | 464/68 |
| 4,747,800 | 5/1988 | Takeuchi | 192/106.2 |
| 4,844,222 | 7/1989 | Casse et al. | 464/68 X |
| 4,969,855 | 11/1990 | Graton et al. | 192/106.2 |

FOREIGN PATENT DOCUMENTS

| | | |
|---|---|---|
| 43-9505 | 4/1968 | Japan . |
| 61-130621 | 6/1986 | Japan . |
| 62-57850 | 12/1987 | Japan . |
| 63-101537 | 5/1988 | Japan . |

Primary Examiner—Daniel P. Stodola
Assistant Examiner—Tony A. Gayoso
Attorney, Agent, or Firm—Armstrong & Kubovcik

[57] ABSTRACT

A damper disc comprises an output member, a pair of input members located at both side thereof, an intermediate member between each input member and output member, and spring mechanisms for coupling the output member and input member. The input member contains a first edge portion to be engaged with a first end portion of the spring mechanism in a first rotating direction, a spring holding portion, and a second edge portion to be engaged with a second end portion of the spring mechanism; the intermediate member contains a second edge portion to be engaged with the second end portion of the spring mechanism, a spring holding portion, a second engaging portion to be engaged with the input member, and a first engaging portion to be engaged with the output member; and the output member contains a first edge portion to be engaged with the first end portion of the spring mechanism.

4 Claims, 1 Drawing Sheet

CLUTCH DAMPER DISC ASSEMBLY

BACKGROUND OF THE INVENTION

1. Field of the Invention

The present invention relates to a damper used in the power transmission route of automobiles or the like, and more particularly to a structure suited to a damper located between a stepless speed change gear and an engine flywheel, in a power transmission route having a belt type stepless speed change gear.

2. Description of the Prior Art

In the damper disc located before the stepless speed change gear as mentioned above, it is required that the relative torsional stiffness of the input part and output part of the damper be low in the driving direction (rotating direction), and in other words it is required that the input part be twisted largely with respect to the output part at a relatively small torque. In such a disk, moreover, it is needed to maintain such low torsional stiffness until the torsional torque increases to a relatively large value (that is, in a wide torsional angle range).

To achieve such high torsional angle and low torsional stiffness, conventionally, in some of the discs, plural compression coil springs were arranged in series as the spring mechanism to be incorporated therein. However, in such structure using series type springs, the position or posture of the springs may be unstable due to effects of centrifugal force, and the spring contacts with its adjacent member, and due to effects of such contact friction, the torsional characteristic becomes unstable as the entire disc.

To solve such problems, for example, as disclosed in the Japanese Laid-open Patent 61-223349, an intermediate member is placed between the output member and the input member, and the spring is maintained in a stable state by this intermediate member.

In this published structure, however, a total of four intermediate members in two different kinds are used, and the number of parts is increased, and the structure becomes complicated. That is, in this disclosed structure, in the torsional action in the normal direction, the input member is engaged with a pair of first intermediate members to move in the same direction, and in the torsional action in the reverse direction, the input member is engaged with the other (second) pair of intermediate members to move in the same direction. Thus, in this structure, one pair of intermediate members to be engaged with the input member in the normal direction, and another pair of intermediate members to be engaged with the input member in the reverse direction are needed, and the structure is complicated.

It is hence a primary object of the invention to present a structure capable of solving the above problems.

More specifically, in the damper disc disposed before the stepless speed change gear, a low torsional stiffness is required in a wide torsional angle range particularly in the driving direction, and the invention is intended to present a damper disc in a simple structure by making use of this characteristic.

SUMMARY OF THE INVENTION

To solve the above problems, the invention presents a damper disc which comprises an annular output member, a pair of input members disposed at both sides in the axial direction thereof, an intermediate member disposed between each input member and output member, and plural spring mechanisms for coupling the output member and input members in the circumferential direction of the disc, wherein plural windows for accommodating said spring mechanisms are formed in said output member, input members and intermediate member at spacings in the circumferential direction, each input member comprises a first edge portion to be engaged with a first end portion of each spring mechanism in a first rotating direction, a spring holding portion enclosing the outer circumference of each spring mechanism near said edge portion, and a second edge portion to be engaged with a second end portion of each spring mechanism in a second rotating direction, the intermediate member comprises a second edge portion to be engaged with the second edge portion of each spring mechanism in the first rotating direction, a spring holding portion for covering the outer circumference of each spring mechanism near said second edge portion, a second engaging portion to be engaged with the input member in the second direction, and a first engaging portion to be engaged with the output member the first direction, and the output member comprises the first edge portion to be engaged with the first end portion of the spring mechanism in the second direction.

According to this structure, when a torque in the first direction is applied from the input member to the output member, the torque is transmitted from the first edge portion of the input member to the second edge portion of the intermediate member by way of the spring mechanism, and is further transmitted from the intermediate member to the output member by way of the first engaging portion. At this time, since the first engaging portion of the intermediate member is engaged with the output member, the both members move in unison. In this operation, the spring mechanism is compressed, and the input member is twisted with respect to the intermediate member and output member, but in this case, the first end portion of the spring mechanism is held by the spring holding portion of the input member, and the second end portion of the spring mechanism is held by the spring holding portion of the intermediate member.

In the twisting action in the second direction, the input member is engaged with the second engaging portion of the intermediate member, and the both members move in unison. In consequence, the torque is transmitted to the output member from both or one of the input member and output member by way of the spring mechanism. In this action, the second end portion of the spring mechanism is held by the spring holding portion of the intermediate member, and the first end portion is held by the spring holding portion of the input member. Meanwhile, the input member moves in the second direction with respect to the output member, and the spring holding portion of the input member moves in the same direction with respect to the first end portion of the spring mechanism, but in the damper for stepless speed change gear or the like, since the torsional angle of the second direction (anti-driving direction) is small, the spring holding portion of the input member will not move to such as position as to be dislocated from the second end portion of the spring mechanism.

DESCRIPTION OF THE PREFERRED EMBODIMENTS

Figure 1:
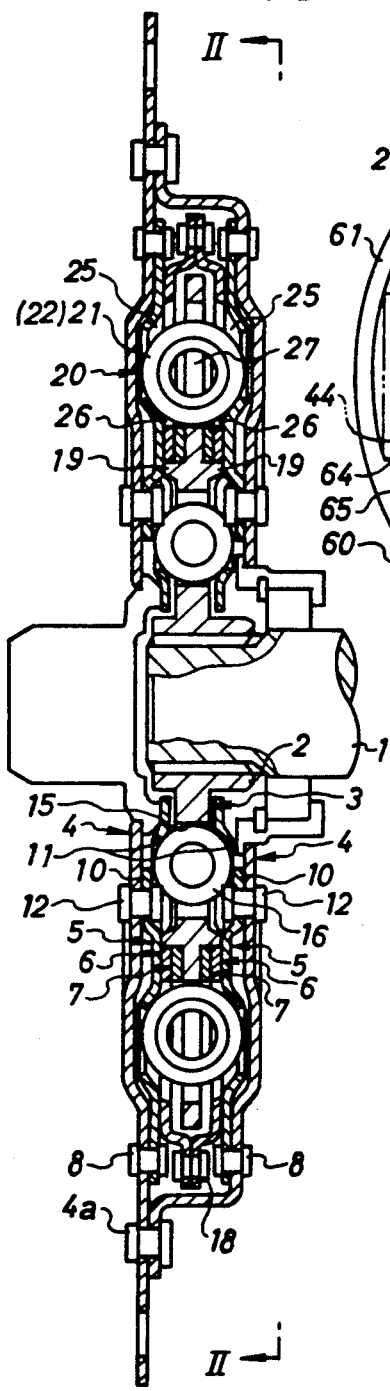
FIG. 1 is a vertical sectional view of a damper disc in an embodiment of the invention.

In FIG. 1, an output shaft 1 is coupled to the input portion of a stepless speed change gear which is not shown. On the outer surface of the output shaft 1, an output hub 2 is coupled through spline. On the outer surface of the output hub 2, an annular output flange 3 is integrally formed, and a pair of covers 4 are provided at both ends of the output flange 3. The both covers 4 are mutually joined and fixed with rivet 4a at the outer side in the radial direction from the output flange 3. One cover is fastened to an engine flywheel (not shown) outward in the radial direction from the rivet 4a. The both covers 4 completely envelope the output flange 3 from both sides in the axial direction and from the outer circumferential side, and the inside space is filled with lubricating oil.

Between each cover 4 and output flange 3, an input plate 5, an intermediate plate 6, and a floating spacer 7 are disposed in a mutually overlapped state.

The input plate 5 is fixed to the cover 4 at its outer circumference by means of a rivet 8. On the inner surface of the input plate 5, three folding parts 10 and three windows 11 are mutually disposed at spacings in the disc circumferential direction, and the folding parts 10 are fixed to the covers 4 by rivets 12.

The output flange 3 has windows 15 aligned in the axial direction to the windows 11. Compression coil springs 16 extending nearly in the circumferential direction are contained in the windows 11 and windows 15.

The floating spacer is in contact with both sides of the output flange 3. The intermediate plate is positioned between each input plate 5 and floating spacer 7, and its outer portion is folded at the outer side in the radial direction from the output flange 3, and is mutually fixed with rivet 18. The output flange 3 is provided with an annular stepped protrusion 9 projecting to the both sides in the axial direction at an intermediate position in the radial direction, and the inner circumference of the intermediate plate 6 and floating spacer 7 are slidably fitted to the outer circumference of the protrusion 19. The floating spacer 7 is combined with springs 21, 22, and compose a spring mechanism 20 as stated below. To accommodate these springs 21, 22, windows 25, 26, 27 are respectively formed in the input plate 5, intermediate plate 6 and output flange 3.

Figure 2:
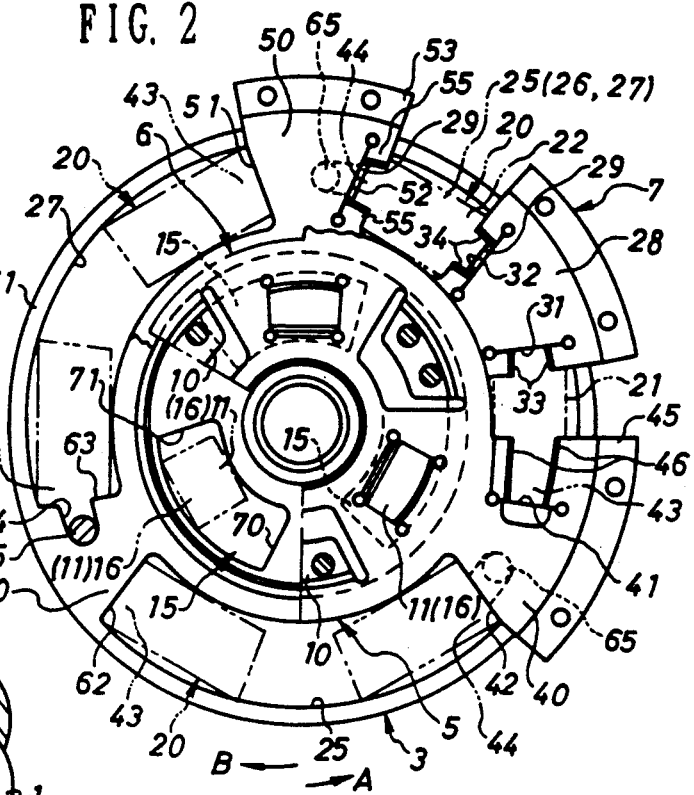
FIG. 2 is a partially cutaway view II—II of FIG. 1.

In FIG. 2, each spring mechanism 20 is serially arranged toward the circumferential direction of the disc, and is composed of two springs 21, 22, floating spacer 7 and arm 28 disposed between them, and spring receptacles 29 disposed at both ends of the spring 22. Three spring mechanisms 20 composed in this manner are provided in the entire disc, and are disposed at mutual spacings in the circumferential direction.

The arm 28 is extending in one body in the radial direction from three annularly continuous inside positions of the floating spacer 7. The outer circumference of each arm 28 is not clearly shown, but is folded, and is fixed to the outer circumference of the other arm 28 by the rivet. The edge portions 31, 32 extending nearly in the disc radial direction of each arm 28 are engaged with the end portions of the springs 21, 22 adjacent thereto. Near the edge portions 31, 32, the arm 28 is provided with awning-shaped spring holding portions 33, 34 surrounding the outer circumference of the end portions of the springs 21, 22. The spring holding portions 33, 34 are covering the end portions of the springs 21, 22 from the opposite side of the output flange 3 and from the disc outer side and disc inner side, thereby stabilizing the positions of the springs 21, 22 in the radial direction and axial direction of the disc.

The input plate 5 integrally incorporates three arms 40 extending radially, and the window 25 is formed between the two of the arms 40. Each arm 40 comprises first edge portion 41 and second edge portion 42 for engaging in the circumferential direction to the spring mechanism 20. In the untwisted state in the drawing, the edge portion 41 is engaged with the end portion at the opposite side of the arm 28 of the spring 21, that is, the first end portion 43 of the spring mechanism 20, while the edge portion 42 is engaged with the end portion at the opposite side of the arm 28 of the spring 22, that is, the second end portion 44 of the spring mechanism 20.

The portion (45) adjoining to the edge portion 41 of the outer circumference of each arm 40 is extending in the circumferential direction to the arm 28 side, and this protruding portion 45 abuts against the arm 28 in the twisting action as described below, and functions as a stopper. Besides, an awning-shaped outer spring holding part 46 is disposed at the inner edge of the protruding part 45, and a similar spring holding part 46 is also disposed at the inner edge part of the window 25, nearly in the same circumferential interval of the outer spring holding part 46. Each pair of spring holding parts 46 functions the same as the spring holding part 33, but it is provided in a longer interval in the circumferential direction than the spring holding part 33. At the second edge 42 side of the arm 40, neither protrusion nor awning-shaped spring holding part is provided.

The intermediate plate 6 also comprises three radially extending arms 50. Each arm has two edge portions 51, 52 which are engaged with the spring mechanism 20 in the circumferential direction. In the untwisted state in the drawing, each first edge portion is engaged with the first end portion of the spring mechanism 20, and the second edge portion 52 is engaged with the second end portion 44 of the spring mechanism 20.

Each arm 50 has a protrusion 53 provided in a state projecting from the outer side of the edge portion 42 in the circumferential direction. At the inner edge portion of the protrusion 53, an awning-shaped spring holding part 55 is provided, and a similar spring holding part 55 is disposed in a manner to cover the spring end portion 44 from the disc radial inner side. These spring holding parts 55 function the same as the spring holding parts 33.

The spring holding parts 55 are designed to function as an engaging portion to be engaged with the input plate 5, aside from the role of guilding and holding the outer circumference of the spring 22. That is, the second edge portion 42 of the input plate 5 is, in the untwisted state in the drawing, arranged in the disc axial direction to the edge portion 52, and the spring holding part 55 is getting into the window 25 of the input plate 5. Therefore, when the input plate 5 is twisted in the direction of arrow B in FIG. 2, the edge portion 42 is engaged with the holding part 55, so that the input plate 5 and intermediate plate 6 rotate in unison.

The output flange 3 has three radial arms 60 located at the outer side. These arms 60 are not integrally continuous to the annular portion on their inner circumference, but the outer circumference is integrally continuous to the annular outer circumference 61. That is, the windows 27 of the output flange 3 are enclosed on the whole periphery, and are not opened outward in the radial direction. Each arm 60 has, in the untwisted state in the drawing, a first edge portion 62 to be engaged with the first end portion 43 of the spring mechanism 20, and a second edge portion 63 to be engaged with the second end portion 44. In the intermediate portion in the radial direction of each edge portion 63, a notch 64 is provided in a state extending in the circumferential direction, and a drive pin 65 extending in the axial direction is placed in the notch 64. The pin 65 has its both ends fastened to the arms 50 of the both intermediate plate 6, and is engaged with the edge portion of the notch 64 in the circumferential direction in the untwisted state in the drawing.

In this structure, the dimensions of the parts are practically determined so as to operate as follows.

According to this structure, the driving torque in the direction of arrow A (FIG. 2) transmitted from the engine to the input plate 5 through the cover 4 is transmitted to the output flange 3 by way of the spring mechanism 20 and spring 16, and is further transmitted to the output shaft 1 from the output flange 3 via the output hub 2.

In this action, the springs 16, 21, 22 are compressed by the force corresponding to the transmitted torque, and accordingly the input plate 5 is deflected with respect to the output flange 3. When this deflected direction is the driving direction (A), the input plate 5 is not engaged with the intermediate plate 6, and the intermediate plate 6 is engaged with the output flange 3 by way of a pin 65. Therefore, the intermediate plate 6 keeps a stationary state with respect to the output flange 3. Or when the deflected direction of the intermediate plate 6 is the anti-driving direction (B), the edge portion 42 of the input plate 5 is engaged with the spring holding part 55 of the intermediate plate 6, and therefore the intermediate plate 6 rotates to the output flange 3, together with the input plate 5.

When the deflected direction is the driving direction (A), the input plate 5 pushes the end portion 43 of the spring mechanism 20 in the same direction by the edge portion 41, and stabilizes the position of the end portion 43 by the spring holding part 46. The torque transmitted from the edge portion 41 of the input plate 5 to the spring 21 is transmitted to the edge portion 52 of the intermediate plate 6 from the end portion 44 of the spring 22 by way of the arm 28, and is further transmitted to the output flange 3 through the pin 65 from the intermediate plate 6. In this action, the other end portion 44 of the spring 22 is held in the stable state by the spring holding part 55. Of course, the end portions of the springs 21, 22 adjacent to the arm 28 are stabilized in the positions in the radial direction and axial direction by the spring holding parts 33, 34.

When the deflected direction is reverse (B), as mentioned above, the input plate 5 and the intermediate plate 6 are formed into one body to push the end portion 44 of the spring mechanism 20, and the torque is transmitted from the end portion 43 of the spring mechanism 20 to the output flange 3. In this action, one end portion 44 of each spring mechanism 20 is held in a stable state by the spring holding part 55 of the intermediate plate 6, while the other end portion 43 is held in a stable state by the spring holding part 46 of the input plate 5. Of course, since the spring holding part 46 of the intermediate plate 5 moves in the deflected direction (B) with respect to the end portion 43, when the torsional angle becomes large, the spring holding part 46 is dislocated from the end portion 43, but before the torsional angle becomes large, the deflection of the input plate is stopped in the following procedure.

Figure 3:
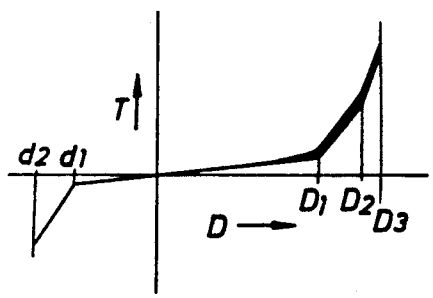
FIG. 3 is a graph showing the torsional characteristic of the disc in FIG. 1.

In FIG. 2, of the windows 11, 15 for spring 16, the circumferential length of the window 11 of the input plate 5 coincides with the circumferential length of the spring 16 in the untwisted state, but the circumferential length of the window 15 of the output flange 3 is longer, and the edge portions 70, 71 of the window 15 are remote from the both ends of the spring 16 in the circumferential direction. The circumferential length is short between the edge portion 71 and the spring 16 in the untwisted state of the drawing, and therefore in the torsional action in the anti-driving direction (B), the edge portion 71 abuts against the spring 16 at a relatively small torsional angle d1 (FIG. 3), and at a slightly larger angle of d2, the spring 16 is fully compressed, and further deflection is inhibited.

On the other hand, the circumferential length of the edge portion 70 and the spring 16 in the untwisted state is long, and therefore in the deflection in the driving direction (A), the angle D2 until the edge portion 70 abuts against the spring 16 is relatively large (FIG. 3), and once reaching this angle D2, the torsional angle increases slightly until reaching D3, when the spring 16 is fully compressed so that further deflection is inhibited.

Thus, before the torsional angle D reaches a relatively large value D2, only the spring mechanism 20 acts as elastic coupling means. Besides, structurally, since each spring 20 is composed by serially arranging two springs 2, 22, the total torsional stiffness is low, and the torsional stiffness as the whole disc is low until the torsional angle reaches a value D1 closer to the value D2 (that is, the rate of increase of torsional angle with respect to the increase of torque T increases). When the torsional angle reaches the value D1, the protrusion 45 in FIG. 2 abuts against the arm 28, and the spring 21 is not further compressed, and only the spring 22 relatively higher in stiffness is compressed. Therefore, in a short interval from the torsional angle D1 to torsional angle D2, the torsional stiffness is somewhat higher.

In the damper disc of the invention the allowable torsional angle is enlarged by installing only one type of intermediate plate 6, and both ends 43, 44 of the spring mechanism 20 may be held in a stable state in any deflecting direction. Therefore, the positions of the springs 21, 22 will not be unstable due to the effects of centrifugal force, and hence the torsional characteristic as the entire disc may be stabilized. Still more, since only one type of intermediate plate 6 is needed, the structure is simple, and the manufacturing cost may be decreased.

A frictional member (washer, wave spring, etc.) may also intervene between the inner circumference of the intermediate plate 6 and the input plate 5, and therefore, by the friction due to relative deflection of the two, a hysteresis torque may be effectively generated in the torsional characteristic.

In the shown structure, three radial arms are provided each for output flange 3, input plate 5, intermediate plate 6, and floating spacer 7, but the number of arms is not limited, and, for example, four arms may be provided each.

What is claimed is:

1. A clutch damper disc assembly comprising an annular output member having a flange portion to be connected to an output shaft, a pair of cover members extending radially outward from opposite sides of said flange portion and joined to each other at their radial outer end portions, a pair of input members having a torque input portion disposed at opposite sides of said flange portion of said output member and inward of said cover said input members being joined at their radial outer end portions to said cover members, a pair of intermediate members disposed between each of said input members and said output member, and plural spring mechanisms for coupling said output member and said input members in the circumferential direction of said clutch damper disc assembly, said output member, said input members and said intermediate members each having a plurality of first windows for accommodating a pair of first springs of first spring mechanisms of said plural spring mechanisms at outer circumferential areas thereof, said input members and said output member each having a plurality of second windows for accommodating second springs of said spring mechanisms at inner circumferential areas thereof, each input member having a first edge portion for engagement with a first end portion of said each first spring mechanism when said clutch damper disc assembly is rotated in a first rotation direction, a first spring holding portion enclosing an outer peripheral end portion of said said first springs of said each first spring mechanism near said first edge portion, and a second edge portion for engagement with a second end portion of said first springs of said each first spring mechanism when said clutch damper disc assembly is rotated in a second rotating direction, said intermediate member having a second edge portion for engagement with said second end portion of said first springs of said each first spring mechanism in said first rotating direction of said clutch damper disc assembly, a second spring holding portion surrounding an outer peripheral end portion of said first springs of said each first spring mechanism near said second edge portion and serving as a second engaging portion for engagement with said input member in said second rotation direction, said each first spring holding portion entering said first window of said input member for engagement with said second edge portion of the input member, and a first engaging portion for engagement with said output member in said first rotation direction, and said output member having a first edge portion for engagement with said first end portion of said first spring mechanism in said second rotation direction.

2. A clutch damper disc assembly according to claim 1, further comprising a pair of floating members having a plurality of arms disposed between said output member and said intermediate member, each of said arms having spring holding portions at opposite edge portions thereof, wherein each arm is arranged between said first springs of said respective first spring mechanism.

3. A clutch damper disc assembly according to claim 1, wherein said first engaging portion is a pin coupling said intermediate members in the axial direction of said intermediate members between said input members and said output member, and said pin engages a notch in said output member for engagement with an end portion of said notch.

4. A clutch damper disc assembly according to claim 1, wherein abrasive members are interposed between inner side portions of each said intermediate members and opposite side portions of said output member.

* * * * *